United States Patent
Helberg et al.

(10) Patent No.: US 8,405,975 B2
(45) Date of Patent: Mar. 26, 2013

(54) DUAL MODE PORTABLE INFORMATION HANDLING SYSTEM COOLING

(75) Inventors: Christopher Helberg, Austin, TX (US); David M. Meyers, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 218 days.

(21) Appl. No.: 13/004,741

(22) Filed: Jan. 11, 2011

(65) Prior Publication Data

US 2012/0176745 A1  Jul. 12, 2012

(51) Int. Cl.
 *H05K 7/20* (2006.01)
(52) U.S. Cl. ......... 361/679.47; 361/679.53; 361/679.54; 361/679.55; 361/695; 361/699; 165/80.3; 165/104.33; 165/121; 165/185; 62/259.2
(58) Field of Classification Search ........... 361/679.47–679.53, 688–702, 361/724–727, 622, 626, 644; 165/80.2–80.5, 165/104.14, 104.19, 104.33, 104.34, 121–126, 165/185; 62/3.2, 259.2; 454/184; 174/15.1, 174/16.3; 312/213, 223.2, 223.1; 257/714
See application file for complete search history.

(56) References Cited

U.S. PATENT DOCUMENTS

| | | | | | |
|---|---|---|---|---|---|
| 4,383,286 A | * | 5/1983 | Hicks | ............................ | 361/695 |
| 5,475,563 A | * | 12/1995 | Donahoe et al. | ............. | 361/695 |
| 5,793,609 A | * | 8/1998 | Donahoe et al. | ............. | 361/695 |
| 5,881,296 A | * | 3/1999 | Williams et al. | ............. | 710/263 |
| 5,881,298 A | * | 3/1999 | Cathey | .......................... | 713/324 |
| 5,898,569 A | * | 4/1999 | Bhatia | ........................... | 361/700 |
| 5,953,211 A | * | 9/1999 | Donahoe et al. | ............. | 361/704 |
| 5,974,556 A | * | 10/1999 | Jackson et al. | ............... | 713/322 |
| 6,181,553 B1 | * | 1/2001 | Cipolla et al. | ........... | 361/679.54 |
| 6,209,626 B1 | * | 4/2001 | Bhatia | ...................... | 165/104.25 |
| 6,276,448 B1 | * | 8/2001 | Maruno | ........................ | 165/185 |
| 6,307,746 B1 | * | 10/2001 | Beckman | ................. | 361/679.46 |
| 6,343,010 B1 | * | 1/2002 | Tanaka | ..................... | 361/679.47 |
| 6,434,001 B1 | * | 8/2002 | Bhatia | ....................... | 361/679.47 |
| 6,459,575 B1 | * | 10/2002 | Esterberg | ................. | 361/679.47 |
| 6,563,703 B2 | * | 5/2003 | Xie | ........................... | 361/679.33 |
| 6,571,340 B1 | * | 5/2003 | Lee | ............................... | 713/300 |
| 6,601,179 B1 | * | 7/2003 | Jackson et al. | ................ | 713/322 |
| 6,646,874 B2 | * | 11/2003 | Pokharna et al. | ........ | 361/679.09 |
| 6,798,660 B2 | | 9/2004 | Moss et al. | | |
| 6,865,077 B2 | * | 3/2005 | Igarashi | .................... | 361/679.21 |
| 6,966,358 B2 | * | 11/2005 | Rapaich | ........................ | 165/80.4 |
| 7,151,667 B2 | * | 12/2006 | Walters et al. | ................ | 361/699 |
| 7,286,346 B2 | * | 10/2007 | Chiba et al. | ............. | 361/679.48 |
| 7,339,789 B2 | * | 3/2008 | Walters et al. | ................ | 361/699 |
| 7,359,197 B2 | * | 4/2008 | Stefanoski et al. | ........... | 361/699 |

(Continued)

FOREIGN PATENT DOCUMENTS

KR  2002034778 A  *  5/2002

*Primary Examiner* — Michail V Datskovskiy
(74) *Attorney, Agent, or Firm* — Hamilton & Terrile, LLP; Robert W. Holland

(57) ABSTRACT

Liquid cooling is selectively enabled at a portable information handling system to provide enhanced processing capabilities when needed or desired. A liquid cooling cold plate conducts thermal energy from a processing component heat pipe or heat sink to a liquid pumped from external to the information handling system housing. The pump operates with power provided from an AC/DC adapter of the information handling system or power provided from an interface with the information handling system, such as a USB port and cable. Alternatively, liquid cooling is included in a cradle to automatically engage with the information handling system is coupled to the cradle.

19 Claims, 3 Drawing Sheets

U.S. PATENT DOCUMENTS

| | | |
|---|---|---|
| 7,423,876 B2 | 9/2008 | Artman et al. |
| 7,542,292 B2 * | 6/2009 | Stefanoski et al. ............ 361/699 |
| 7,663,876 B2 * | 2/2010 | Lin ............................ 361/679.47 |
| 7,889,499 B2 * | 2/2011 | Lowell et al. .................. 361/689 |
| 7,948,754 B2 * | 5/2011 | Huang ............................ 361/692 |
| 7,991,515 B2 * | 8/2011 | Lyon et al. ..................... 700/300 |
| 8,208,250 B2 * | 6/2012 | Mongia .................... 361/679.47 |
| 8,270,168 B2 * | 9/2012 | Lin et al. ........................ 361/707 |
| 2003/0174467 A1 * | 9/2003 | Lu ................................. 361/695 |
| 2005/0009404 A1 * | 1/2005 | Lee ............................... 439/638 |
| 2005/0141196 A1 * | 6/2005 | Yamatani et al. .............. 361/699 |
| 2005/0225942 A1 * | 10/2005 | Lee ................................ 361/700 |
| 2006/0087810 A1 * | 4/2006 | Rockenfeller ................ 361/685 |
| 2006/0277923 A1 * | 12/2006 | Lee .................................. 62/3.2 |
| 2008/0186670 A1 * | 8/2008 | Lyon et al. ..................... 361/687 |
| 2009/0178783 A1 * | 7/2009 | Lin ............................. 165/80.4 |
| 2011/0032672 A1 | 2/2011 | Artman et al. |
| 2011/0200219 A1 * | 8/2011 | Vizcarra et al. ............... 381/332 |
| 2012/0090343 A1 * | 4/2012 | Couto et al. ................. 62/259.2 |

* cited by examiner

DUAL MODE PORTABLE INFORMATION HANDLING SYSTEM COOLING

BACKGROUND OF THE INVENTION

1. Field of the Invention

The present invention relates in general to the field of information handling system cooling, and more particularly to dual mode portable information handling system cooling.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems provide a wide range of performance capabilities based upon the type of components included in the system. For example, processing capability depends upon the number of instructions that a processor can execute in a given time period. To make effective use of a powerful processor, the system typically needs a sufficient quantity of RAM for storing instructions and high capacity links to communicate information between the processor and desired components. In some instances, processor performance is enhanced by moving processing functions from a central processor unit (CPU) to supporting processors. For example, a graphics processor unit (GPU) executes instructions under the direction of a CPU to generate images for presentation at a display. In general, more powerful information handling systems have a larger housing to hold components. A larger-sized housing typically allows more room for the components and for supporting equipment, such as cooling fans. Typically, more powerful processing components tend to have greater amounts of heat generated as a by-product of processing instructions. The heat is removed by heat sinks and cooling fans that blow air over the components and out of the housing. A larger-sized housing provides more room for heat transfer devices and cooling airflow. In some instances, cooling is accomplished by passing a contained liquid flow proximate the heat-generating component since liquid typically provides a more efficient heat transfer medium than air.

Difficulties with heat transfer tend to increase as the size of an information handling system housing decreases. Portable information handling systems generally have relatively small housings so that an end user can hold the system during use. Portable information handling systems typically incorporate an integrated display and battery power source so that an end user can operate the system free from any external interfaces. In order to reduce system size and weight, components are often selected to build portable information handling systems so that heat generation and power consumption by the components fall within tight constraints. As a result, portable information handling systems typically have reduced processing capabilities relative to desktop or tower systems. Further, portable information handling systems often include power and cooling system logic that attempts to alter system operations to extend battery life and avoid overheating. One example of a way to avoid excessive power consumption and heat generation is to run a processor at a reduced speed, however, running a processor at reduced speed also reduces system performance. An end user may find reduced performance acceptable for some functions, such as word processing, however other functions often need full system performance to provide meaningful use to an end user, such as for gaming. In any event, the capability of a processor included with a portable information handling system is limited by the ability of the system to remove excess heat generated by the processor, which in turn is for practical purposes generally limited by the size of the housing.

SUMMARY OF THE INVENTION

Therefore a need has arisen for a system and method which supports dual mode portable information handling system cooling.

In accordance with the present invention, a system and method are provided which substantially reduce the disadvantages and problems associated with previous methods and systems for cooling a portable information handling system. Liquid cooling is selectively applied at a heat transfer device within an information handling system to supplement cooling otherwise available, such as passive cooling or cooling provided by airflow from a fan. When liquid cooling is available, processing components having the supplement cooling can operate at greater speeds since excess heat created by the greater operating speeds is removed by the liquid cooling. When liquid cooling is not available, processing components operate in a throttled condition as needed to maintain thermal constraints.

More specifically, a portable information handling system housing contains processing components that cooperate to process information, a display to present information and a battery to power the processing components and display. A cooling fan generates cooling airflow across a thermal transfer device, such as heat sink or heat pipe, to remove thermal energy generated as a by-product of the operation of one or more processing components. A cold plate disposed in the housing proximate the thermal transfer device accepts thermal energy from the thermal transfer device to liquid of a liquid cooling device. The liquid cooling device liquid removes thermal energy to the environment external to the housing with a pump and radiator disposed external to the housing. The liquid cooling device is selectively removable from information handling system 10, such as by disconnecting tubes of the liquid cooling system from the housing or removing the cold plate from the housing. When liquid cooling is available, processing components can operate at greater speeds that generate excess heat with the liquid cooling supplementing other cooling available at the information handling system. When liquid cooling is not available, processing components within the information handling system operate at throttled speeds to prevent overheating.

The present invention provides a number of important technical advantages. One example of an important technical advantage is that a portable information handling system includes selectively-activated processor liquid cooling that will allow powerful processors to operate at high speeds with minimal impact on housing size. An external liquid pump conveniently adds system cooling when desired in both a portable and fixed configuration. For example, including a liquid pump with an AC-DC adapter provides ready availability when operating on external power while a USB interface provides power for liquid pumping when operating on internal power. Alternatively, including liquid cooling with a housing cradle supports full system capabilities when in a fixed configuration that are not otherwise available in portable systems due to limitations of air cooling. A removable cooling plate that couples and decouples proximate to a heat sink or heat pipe maintains liquid cooling fluids in a separate integrated system for ready use with limited risk of spilling the fluid. When liquid cooling is unavailable, the processor or other heat-generating device continues to operate at a lower capability within the limits of air cooling.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Selective configuration of liquid cooling at a portable information handling system supports enhanced processing capability when liquid cooling is available and light weight portability when liquid cooling is removed. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
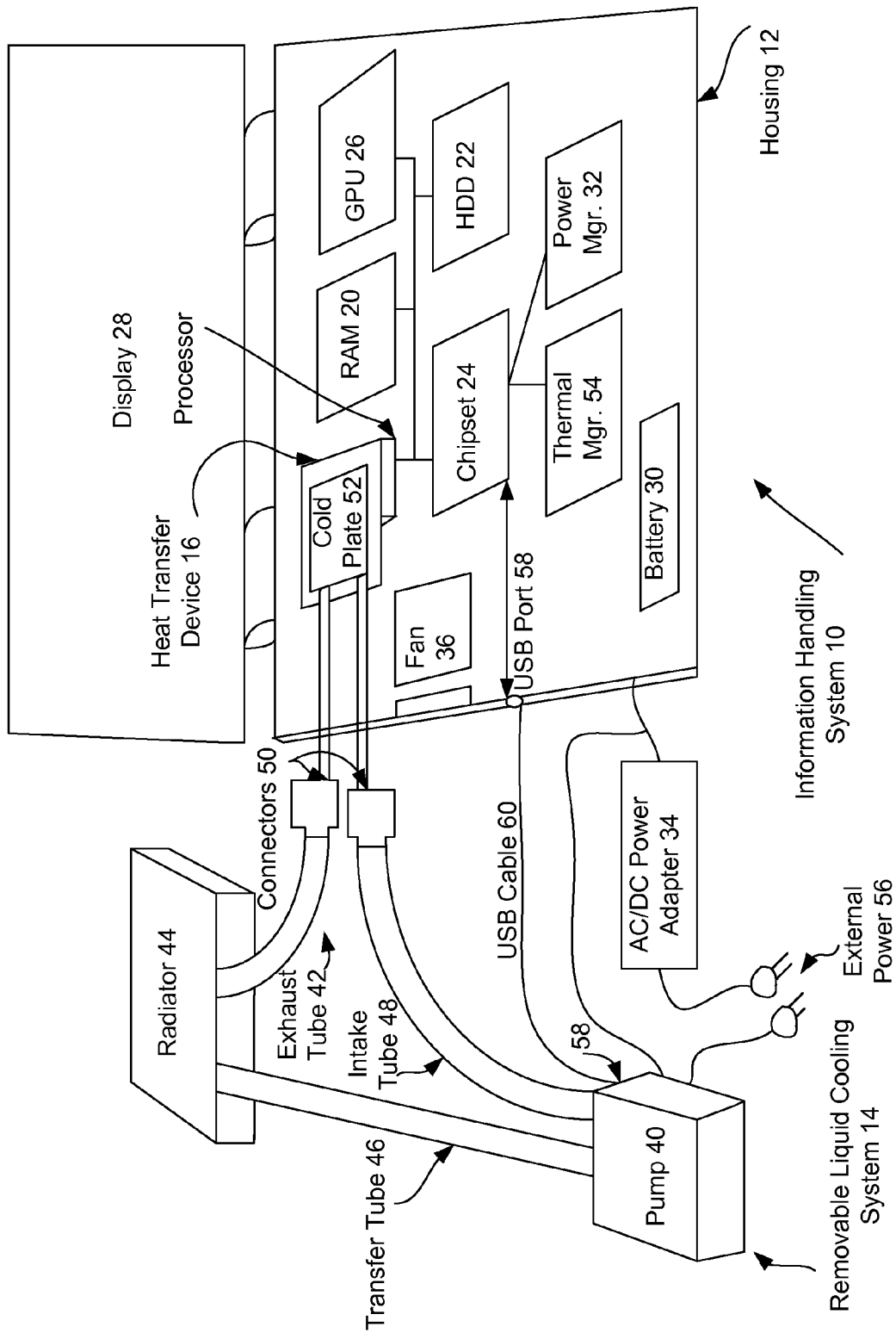
FIG. 1 depicts an information handling system in a portable housing having a selectively removable liquid cooling system interfaced with a processor heat transfer device.

Referring now to FIG. 1, an information handling system 10 in a portable housing 12 has a selectively removable liquid cooling system 14 interfaced with a processor heat transfer device 16. Information handling system 10 includes plural processing components that cooperate to process information, such as a central processing unit (CPU) 18, RAM 20, hard disk drive 22, chipset 24 and graphics processing unit (GPU) 26. Information handling system 10 has a portable configuration that allows operation without external devices, such as with an integrated display 28 for presenting information as visual images and a battery 30 for powering the processing components. During portable operations, a power manager 32 directs battery 30 to power components. If external power is available, an external AC/DC adapter 34 provides power to the components and to charge battery 30. A fan 36 disposed within housing 12 generates a cooling airflow past the processing components and heat transfer device 16 to carry heat through a vent 38 and out of housing 12.

Removable liquid cooling system 14 selectively interfaces cooling liquid with heat transfer device 16 to provide additional cooling for the processing components, such as CPU 18. For example, a pump 40 draws a water glycol mixture from information handling system 10 through an exhaust tube 42 to a radiator 44, which transfers heat from the liquid to the atmosphere external to information handling system 10, such as with a fan in radiator 44 that blows cooling past heat transfer portions in radiator 44. Pump 40 then draws cooled liquid from radiator 44 through a transfer tube 46 and provides the cooled liquid through an intake tube 48 back to information handling system 10. Intake tube 48 and exhaust tube 42 selectively interface through connectors 50 to a cold plate 52 disposed within housing 12. When connectors 50 couple to cold plate 52, liquid from pump 40 is in fluid communication with cold plate 52 to aid in cooling heat transfer device 16. When connectors 50 decouple from cold plate 52, liquid is not available for cooling heat transfer device 16 so that cooling is accomplished by fan 36 without the aid of liquid cooling. A thermal manager 54 monitors temperatures within housing 12 and at the processing components to ensure that thermal constraints are not exceeded. For example, without the availability of liquid cooling, thermal manager 54 constrains the operating speed of CPU 18 to prevent the generation of excess thermal energy and run fan 36 at higher speeds; with the availability of liquid cooling thermal manager 54 allows operation of CPU 18 at full speed and minimizes the speed of fan 36 to reduce power consumption and noise. In alternative embodiments, other processing components, such as GPU 26, are cooled with liquid cooling or throttled in the absence of liquid cooling. In one embodiment, CPU 18 is designed to require liquid cooling in order to operate at full speed, such as to support gaming applications, with a throttled state to provide minimal functionality without liquid cooling, such as to support word processing or web browsing activities.

In the example embodiment depicted by FIG. 1, pump 40 and a fan in radiator 44 obtain power from a selected of plural power sources. Power may come from an external power source 56, such as an AC outlet. Alternatively, AC/DC adapter 34 that provides power to information handling system 10 can also provide power to pump 40. As a third alternative, power is provided from battery 30 of information handling system 10 through an external interface, such as a USB ports 58 located at housing 12 and pump 40 and a USB cable 60. In most circumstances, a constant speed pump 40 provides adequate liquid flow for cooling across the operational thermal range of information handling system 10. In an alternative embodiment, the speed or operation of pump 40 is managed through communication across USB cable 60. For example, pump 40 is operated at a slow speed or intermittently to maintain a desired thermal condition at heat transfer device 16 while reducing noise and power consumption.

Figure 2:
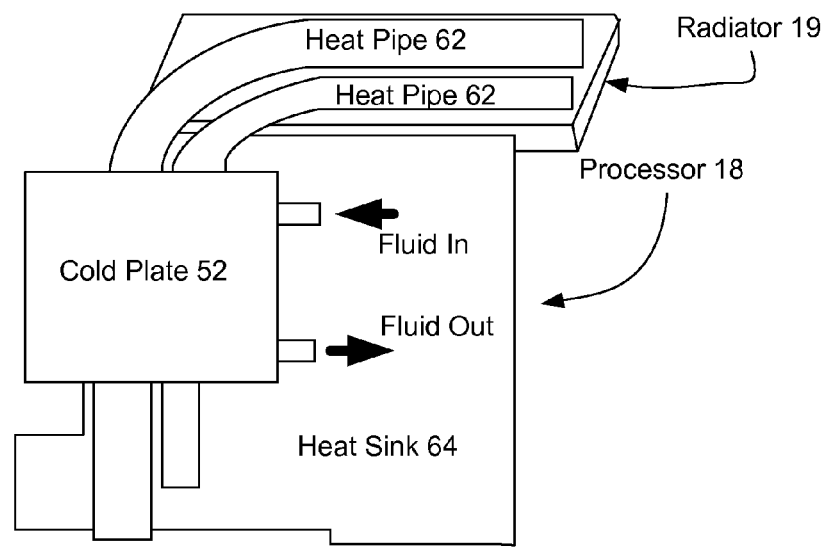
FIG. 2 depicts a liquid cooling system cold plate affixed to a heat pipe.

Referring now to FIG. 2, a liquid cooling system cold plate 52 is affixed to a heat pipe 62. Heat pipe 62 provides a thermal conduction path from processor 18 to a radiator 19 disposed in a cooling airflow generated by fan disposed beneath radiator 19. Processor 18 is disposed beneath a heat sink 64 that spreads heat generated by processor 18 to the heat pipes 62. Cooling plate 52 is affixed to heat pipe 62 in a permanent fashion, such as with solder or screws, so that high thermal conduction is available from heat pipe 62 to liquid disposed in cold plate 52. Liquid cooling is applied to cold plate 52 by selectively engaging liquid or disengaging liquid with a sealed connection accessible at the housing of information handling system 12. In alternative embodiments, cold plate 52 may include an attachment device that selective attaches and detaches with a thermally-conductive material that is in thermal connection with a cooling liquid. Affixing cold plate 52 in a permanent manner provides optimal thermal conduction, however, removable coupling and de-coupling of cold plate 52 or a portion of cold plate 52 to heat pipe 62 provides adequate thermal conduction with the advantage of keeping cooling liquid within a contained environment without having to rely on sealed connectors.

Figure 3:
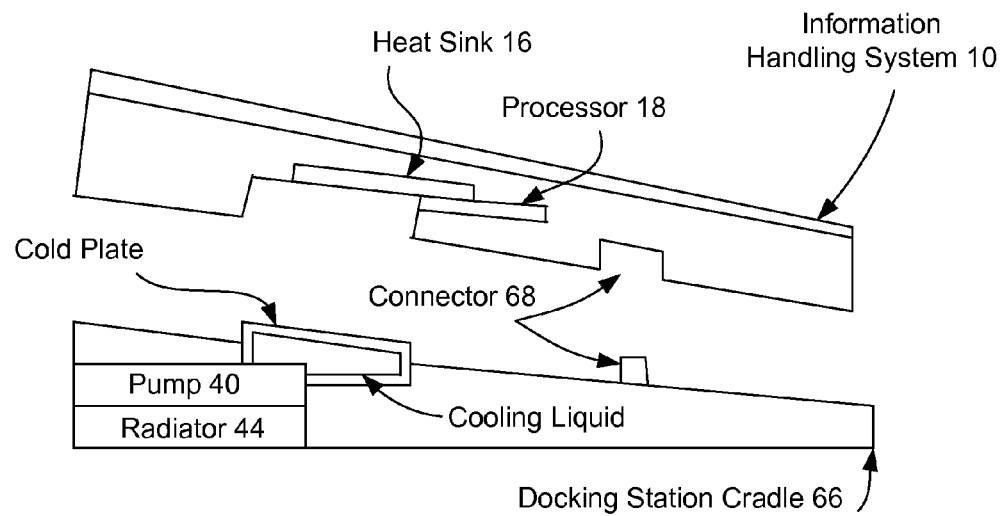
FIG. 3 depicts a portable information handling system aligned to receive liquid cooling from a docking station cradle.

Referring now to FIG. 3, a portable information handling system is aligned to receive liquid cooling from a docking station cradle 66. Docking station cradle 66 has a connector 68 to support power and peripheral interactions with information handling system 10 as with a conventional cradle, however, includes a cold plate 52 aligned to insert into an opening 70 formed in the bottom surface of information handling system 10. Cold plate 52 is in liquid communication with pump 40 and radiator 44 of cradle 66 so that liquid cooling is available through cold plate 52 to a heat sink 16 or other heat transfer device within the housing 12 of information handling system 10. Opening 70 is selectively closed when information handling system 10 is removed from cradle 66 to prevent end user interaction with heated internal components of information handling system 10. When docked at cradle 66 with liquid cooling provided by cold plate 52 to heat sink 16, information handling system can operate with increased processing speeds because excess thermal energy is removed from housing 12 with liquid cooling. When undocked so that liquid cooling is not available, a fan 36 provides cooling adequate to support operations with lower processor speeds.

Figure 4:
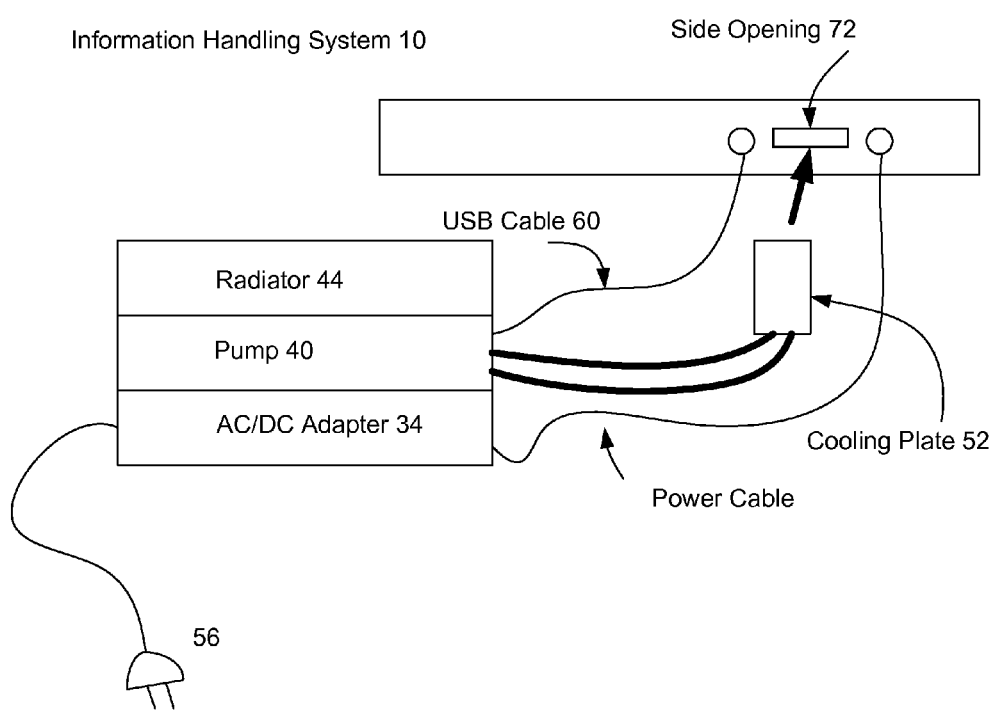
FIG. 4 depicts an external liquid cooling pump powered by an external information handling system AC/DC adapter or a USB connection with the information handling system.

Referring now to FIG. 4, an external liquid cooling pump 40 is powered by an external information handling system AC/DC adapter 34 or a USB connection 58 with the information handling system 10. AC/DC adapter 34, pump 40 and radiator 44 are coupled together in a contiguous piece for ease of operation. In an alternative embodiment, AC/DC adapter 34 selectively separates from pump 40 to provide power without liquid cooling. Cold plate 52 inserts into a side opening 72 of housing 12 to a position proximate a heat transfer device within housing 12. Although a removable cold plate may not provide as much thermal conduction as a cold plate that is affixed within housing 12, a biasing mechanism within housing 12 provides adequate physical contact between removable cold plate 52 and the internal heat transfer device so that thermal conduction between the internal heat transfer device and liquid associated with cold plate 52 takes place. Having cold plate 52 as a removable component allows liquid to remain in a contained environment to help reduce the risk of inadvertent leaks that might damage electronic components.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   plural processing components disposed in the housing and operable to process information;
   a display integrated with the housing to present information as images;
   a battery disposed in the housing and operable to power the processing components;
   a first heat transfer device disposed in the housing and interfaced with one or more of the processing components, the heat transfer device operable to transfer heat from the one or more processing components towards a cooling airflow;
   a cooling fan disposed in the housing and operable to generate the cooling airflow;
   a second heat transfer device disposed in the housing and interfaced with the first heat transfer device, the second heat transfer device operable to transfer heat from the first heat transfer device to a liquid, at least a portion of the second transfer device selectively removable from the housing;
   a pump external to the housing and operable to pump liquid to the second heat transfer device to remove heat from within the housing; and
   a cable extending from a port of the housing to the pump, the cable providing power and communications to the pump to manage the pump speed for pumping the liquid.

2. The information handling system of claim 1 wherein the cable from the housing to the pump provides power from the battery to the pump.

3. The information handling system of claim 2 wherein the cable comprises a USB cable from a USB port of the housing to a USB port of the pump.

4. The information handling system of claim 3 further comprising logic on the pump operable to communicate through the USB cable to the processing components to provide information regarding the pump.

5. The information handling system of claim 1 further comprising:
   a power adapter external to the housing and operable to provide power to the processing components and battery; and
   a power interface between the power adapter and the pump to provide power directly from the power adapter to the pump.

6. The information handling system of claim 5 wherein the pump couples to the power adapter at the power interface to form a contiguous component.

7. The information handling system of claim 1 wherein the second heat transfer device comprises a cold plate affixed to the first heat transfer device and a tube removably coupled to the cold plate, the cold plate operable to thermally conduct heat from the first heat transfer device to liquid in the tube, the tube in fluid communication with the pump.

8. The information handling system of claim 7 wherein the first heat transfer device comprises a heat pipe.

9. The information handling system of claim 1 wherein the second heat transfer device comprises a cold plate removably coupled to the first heat transfer device, the cold plate selectively removable from the housing.

10. The information handling system of claim 9 wherein the cold plate selectively engages and disengages the first heat transfer device through an opening in housing bottom.

11. A method for cooling an information handling system, the method comprising:

conducting heat from a processing component disposed in a housing to a first thermal device affixed in the housing;

removing heat from the first thermal device with a cooling airflow generated by a fan disposed in the housing;

selectively engaging a second thermal device with the first thermal device, the second thermal device having a liquid that conducts heat from the first thermal device to a heat exchange located external to the housing;

detecting the engagement of the second thermal device with the first thermal device; and in response to detecting the engagement, altering the operation of the fan.

12. The method of claim 11 wherein altering the operation of the fan comprises at least turning off the fan.

13. The method of claim 11 wherein selectively engaging further comprises:

affixing a cold plate to the first thermal device within the housing; and selectively interfacing a tube with the cold plate, the tube providing the liquid from external to the housing to the cold plate internal to the housing.

14. The method of claim 11 wherein selective engaging further comprises:

selectively inserting a cold plate from external to the housing into the housing to reside proximate the first thermal device; and cooling the cold plate with liquid provided from external to the housing.

15. The method of claim 14 wherein selectively inserting the cold plate further comprises inserting the cold plate through an opening in the bottom of the housing.

16. The method of claim 11 further comprising powering a pump to pump the liquid with a power adapter that also powers the information handling system.

17. The method of claim 11 further comprising powering a pump to pump the liquid with a USB cable from the information handling system to the pump.

18. A system for cooling an information handling system comprising:

a pump operable to pump a liquid;

a radiator interfaced with the pump and operable to transfer heat from the liquid;

cold plate interfaced with the pump and radiator, the cold plate operable to selectively couple and decouple with a heat transfer device of the information handling system to transfer heat from the heat transfer device to the liquid; and a USB port interfaced with the pump and operable to accept power and management of pump operations.

19. The system of claim 18 further comprising an AC/DC adapter operable to covert AC power to DC power for use by the information handling system, the AC/DC adapter having a cable to couple to a power port at the information handling system housing and having an interface to power the pump.

* * * * *